July 22, 1952  R. B. BASHAM ET AL  2,604,526
LINE MEASURING DEVICE WITH CORRECTING MECHANISM
Filed Jan. 14, 1950
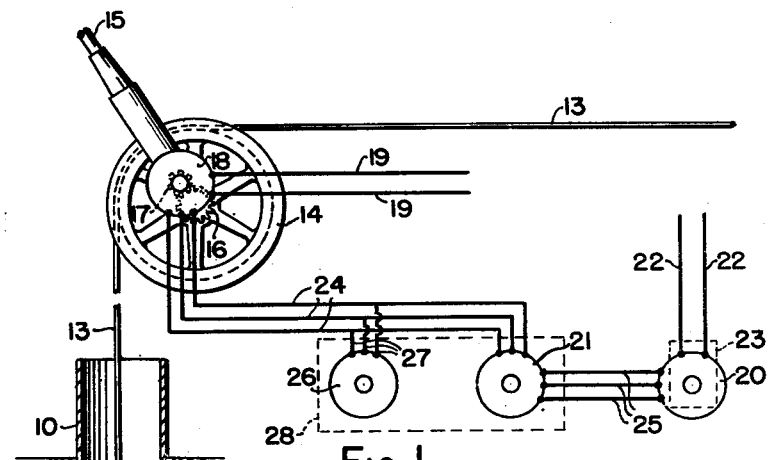
FIG. 1.
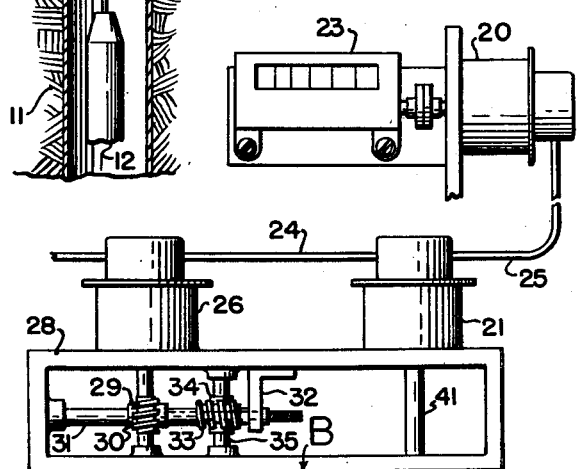
FIG. 2.
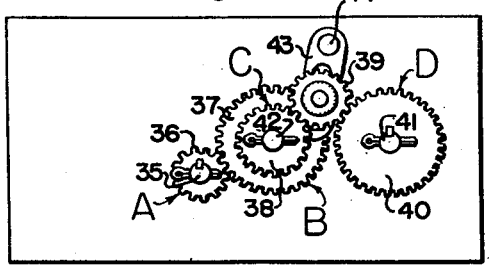
FIG. 3.
| CORRECTION FT. PER 1000 FT. | GEAR SIZE NO. TEETH | | | |
|---|---|---|---|---|
| | A | B | C | D |
| .1 | 20 | 40 | 12 | 60 |
| .2 | | | 20 | 50 |
| .3 | | | 24 | 40 |
| .4 | | | 24 | 30 |
| .5 | | | 20 | 20 |
| .6 | | | 24 | 20 |
| .7 | | | 28 | 20 |
| .8 | | | 32 | 20 |
| .9 | | | 36 | 20 |
| 1.0 | | | 40 | 20 |
| 1.1 | ↓ | ↓ | 44 | 20 |
| 1.2 | | | 48 | 20 |
| 1.3 | 40 | 20 | 26 | 40 |
| 1.4 | | | 21 | 30 |
| 1.5 | | | 24 | 32 |
| 1.6 | | | 24 | 30 |
| 1.7 | | | 34 | 40 |
| 1.8 | | | 27 | 30 |
| 1.9 | | | 20 | 21 |
| 2.0 | | | 20 | 20 |
| 2.1 | | | 21 | 20 |
| 2.2 | | | 22 | 20 |
| 2.3 | | | 23 | 20 |
| 2.4 | ↓ | ↓ | 24 | 20 |
| 2.5 | | | 25 | 20 |
FIG. 4.
RAYMOND B. BASHAM
CHARLES W. MACUNE
Inventors
Herbert J. Brown
By  Attorney Patented July 22, 1952

2,604,526

UNITED STATES PATENT OFFICE 2,604,526

LINE MEASURING DEVICE WITH CORRECTING MECHANISM

Raymond B. Basham and Charles W. Macune, Fort Worth, Tex., assignors to Westronics, Inc., Fort Worth, Tex., a corporation of Texas Application January 14, 1950, Serial No. 138,662

4 Claims. (Cl. 177—351)

This invention relates to line measuring apparatus. Although the invention has many applications, it is particularly useful for determining the depth of a mechanism attached to a cable and lowered in a well.

In servicing oil and gas wells it is often important to have an instrument or device lowered to an exact depth, as when perforating casing opposite an oil or gas bearing formation, locating cementing plugs, and when logging or surveying the geological characteristics of a well. The general practice of determining the depth to which an instrument has been lowered in a well has been to run a line or cable supporting the instrument over a sheave and counting the revolutions of the latter with a mechanical meter. However, the referred to method was objectionable in that it did not provide for inaccuracies in the diameters of the sheave or line. For example, if the diameter of a sheave was slightly oversize or undersize, the resulting count would inaccurately locate the instrument above or below the indicated depth. All sheave wheels used for the described purpose are intended to be of an accurately known diameter, but due to wear, or other reasons, these diameters do not remain the same as originally made. The diameter of the line or cable also affects the accuracy of the results obtained by counting the revolutions of the sheave. Operators of well servicing equipment usually know the exact inaccuracies of the diameters of the sheaves and the lines since they may be determined by actual tests in wells of known depth. When servicing a well it is impractical to make allowance for these corrections mathematically as this would be time consuming, and therefore undesirable. In as much as several thousand feet of line may be lowered into a well at one time, a slight inaccuracy in the sheave or cable diameter, or both, may result in the instrument being located incorrectly with respect to the intended depth. To compensate for such inaccuracies, the use of gear trains alone would involve a complicated gear train of numerous gears, and many such gears would be required to make slight changes from time to time due to the continued wear of the sheave or cable, or both.

An object of the invention is to provide an accurate means for correcting slight known variations in a sheave or cable used for lowering a mechanism or instrument in a well when the revolutions of the sheave are counted to determine the depth of said mechanism or instrument.

Another object of the invention is to provide a compact mechanism for the purposes referred to in the foregoing object.

Another object of the invention is to provide, in a line measuring device of the described class, a relatively simple device which avoids the use of a large number of gears for making only slight correction changes in the gear ratio.

A further object of the invention is to provide a selsyn operated counter for conveniently determining the number of revolutions of a sheave, and at the same time, provide for corrections of known inaccuracies in the diameters of the sheave or line.

These and other objects of the invention will become apparent from the following description, and from the accompanying drawings, wherein:

Figure 1 is a schematic view showing a portion of a well in section, and having a sheave thereabove for lowering a line and instrument attached thereto into said well, together with a wiring diagram of the present invention and showing the same mechanically coupled with the sheave.

Figure 2 is a plan view of the line compensator unit and counter.

Figure 3 is a front elevation of Figure 2.

Figure 4 is a gear chart showing a selection of gears for correcting the known errors.

In the drawings, the numeral 10 indicates a well casing in the earth 11, and into which a well surveying instrument 12 is lowered by means of a cable or line 13. The line 13 passes over a sheave 14 which is rotatably supported above the earth's surface by means of a bracket 15 attached to the well derrick (not shown). A gear 16 is secured to the center of the sheave 14 and meshes with the driven gear 17 of a selsyn transmitter 18. Current supply lines 19 are connected with the rotor of the selsyn transmitter 18. The stator fields of the transmitter 18 are connected with a selsyn repeater 20 after passing through the fields of a selsyn differential 21. The rotor of the repeater 20 is also connected with the current supply by lines 22. The rotor of the repeater is mechanically coupled with a mechanical counter 23, as shown in the upper portion of Figure 2. The described connections between the transmitter 18 and the differential 21, and between the differential 21 and the repeater 20, are respectively indicated by the numerals 24 and 25.

All selsyns, such as herein referred to, include rotors and stators, and are well-known to the art; hence, the rotors and stators are not illustrated in detail, nor are they referred to by number.

The stator fields of an additional selsyn repeater 26 are connected with lines 24 by additional lines 27. The additional repeater 26, as well as the selsyn differential 21, is mounted on a rectangular box-like frame, as shown in Figure 2. The rotor of the selsyn repeater 26 is mechanically coupled with a worm journaled in the frame 28. The worm 29 drives a worm gear 30 mounted on a shaft 31 which is also journaled in the frame 28, and is supported at one end thereof by a bracket 32. The shaft 31 is also provided with a worm 33 which drives another worm gear 34 mounted on a transverse shaft 35. Preferably, the ratio between the driven rotor of the additional or intermediate repeater 26 and the last described shaft is 1000 to 1 so as to simplify the selection of spur gears referred to in the chart, Figure 4. In view of the low gear ratio between the worm 29 and the driven worm gear 34, it is not necessary to supply power to the rotor of the intermediate repeater 26, although such power may be supplied if desired.

The outer end of the last described shaft 35 projects outwardly from the face of the frame 28 where it is provided with a gear 36 which drives a train of other gears 37, 38, 39 and 40. The last referred to gear 40 is mounted on a shaft 41 which is mechanically coupled with the rotor of the selsyn differential 21. The second and third referred to gears 37 and 38 are mounted on a single stub shaft 42 and are keyed to each other. The fourth referred to gear 39 is an idler gear and is arranged to mesh with the gear 38 and the gear 40. The idler gear 39 is supported on a bracket 43 hingedly mounted on the frame 28 by means of a projecting stub shaft 44. For convenience in identifying the respective gears 36, 37, 38 and 40 in the chart illustrated in Figure 4, these said gears are respectively identified as A, B, C and D.

In operation, the rotor of the selsyn transmitter 18 is turned by the gears 16 and 17 as the instrument is lowered in the casing 10 by running the line 13 over the sheave 14. Preferably, the ratio of the gears connected with the sheave 14 is such that the circumference of the sheave is easily calculated in feet. The selsyn repeater 20 connected with the counter 23 is driven by the selsyn transmitter 18 after the current therefrom passes through the selsyn differential 21. The known error in the diameter of the sheave 14 or the cable 13 is corrected by an arrangement of the gears A, B, C and D in accordance with the chart illustrated in Figure 4. For example, if a correction of plus one foot per 1000 feet is required, the gears A, B, C and D will have, respectively, 20, 40, 40 and 20 teeth. In other words the 1000 to 1 gear ratio of the fixed reduction gear, comprising the worms and gears 29, 30, 34 and 35, are transmitted mechanically to the shaft 41 which is mechanically coupled with the rotor of the selsyn differential 21. Thus, only the ratio 1000 to 1 is effective. If a correction of plus 1 foot per 1000 feet is necessary, the gears A, B, C and D will respectively have 20, 40, 12 and 60 teeth and a ratio of 10 to 1 with respect to gear A. Since the worm gear 34 is not a ratio of 1000 to 1 with respect to the worm gear 29, the total gear ratio between the worm 29 of the driven gear D will be 10,000 to 1.

Although a minus correction could be obtained by reversing the order of gears, such minus correction may be more easily obtained by reversing the position of the connecting wires 27 so as to rotate the rotor of the intermediate repeater 26 in an opposite direction.

By reason of the described construction and arrangement, it is obvious that the transmitter 18 would ordinarily rotate the rotor of the selsyn repeater 20 an equal number of revolutions. If it were not for the described gear arrangement, the selsyn differential would not rotate and would merely act as a transformer and would have the same effect as if there were direct electrical connections therethrough. However, the mechanical coupling between the rotor of the additional or intermediate repeater with the rotor of the differential 21 imparts a rotation to the latter which, in turn, is electrically transferred to the rotor of the repeater 20 and thereby affects the correction on the counter 23.

The described form of the invention is not restrictive, but may be made in many ways within the scope of the appended claims.

What is claimed is:

1. A line measuring apparatus comprising a sheave adapted to be turned by the line to be measured, a selsyn transmitter connected with and driven by said sheave, a selsyn repeater having an indicator connected therewith, a selsyn differential electrically connecting said transmitter and said repeater, an additional selsyn repeater electrically connected with said transmitter, and a gear train connecting the rotor of said additional repeater with the rotor of said differential.

2. A line measuring apparatus comprising a selsyn transmitter adapted to be connected with and rotated by the line to be measured, a selsyn repeater having an indicator connected therewith, a selsyn differential electrically connecting said transmitter and said repeater, an additional selsyn repeater electrically connected with said transmitter, and a gear train connecting the rotor of said additional repeater with the rotor of said differential.

3. A line measuring apparatus comprising a selsyn transmitter adapted to be connected with and rotated by the line to be measured, a selsyn repeater having an indicator connected therewith, a selsyn differential electrically connecting said transmitter with said repeater, an additional selsyn repeater electrically connected with said transmitter, a worm gear mechanism connected with the rotor of said additional repeater, and a gear train connecting said worm gear mechanism with the rotor of said differential.

4. A line measuring apparatus as defined in claim 3, and wherein said worm gear mechanism has a gear ratio in a multiple of 10 to 1.

RAYMOND B. BASHAM.
CHARLES W. MACUNE.

REFERENCES CITED

The following references are of record in the file of this patent:

UNITED STATES PATENTS

| Number | Name | Date |
|---|---|---|
| 1,637,039 | Hewlett | July 26, 1927 |
| 1,743,252 | Tanner | Jan. 14, 1930 |
| 1,743,741 | Warren | Jan. 14, 1930 |
| 1,755,340 | Sperry | Apr. 22, 1930 |

FOREIGN PATENTS

| Number | Country | Date |
|---|---|---|
| 250,922 | Great Britain | Aug. 26, 1926 |